Jan. 5, 1965    M. J. LUGASH    3,164,399
HINGED SEMI-TRAILER COUPLING UNIT
Filed Nov. 19, 1962    2 Sheets-Sheet 1
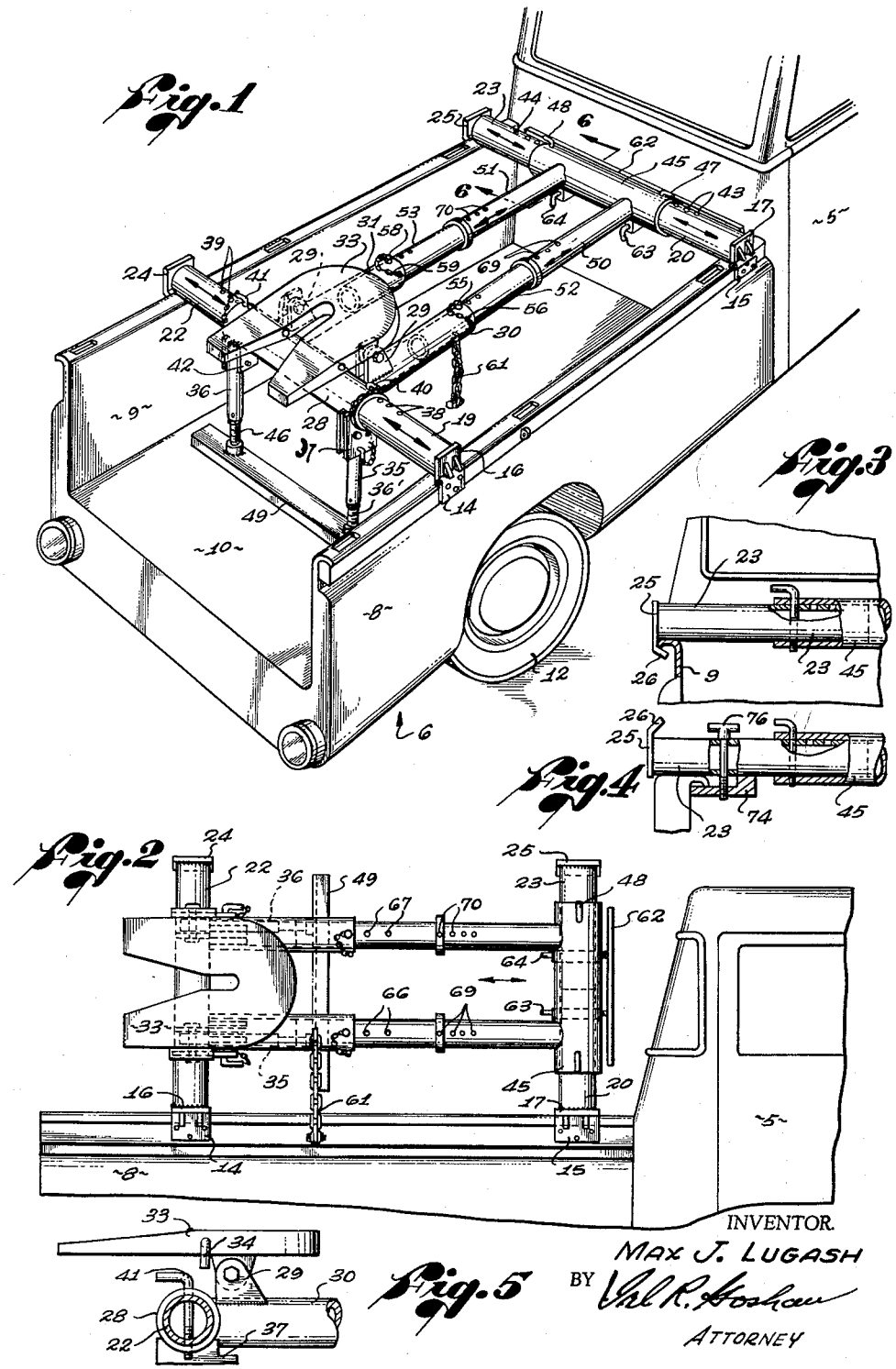
INVENTOR.
MAX J. LUGASH
BY
ATTORNEY

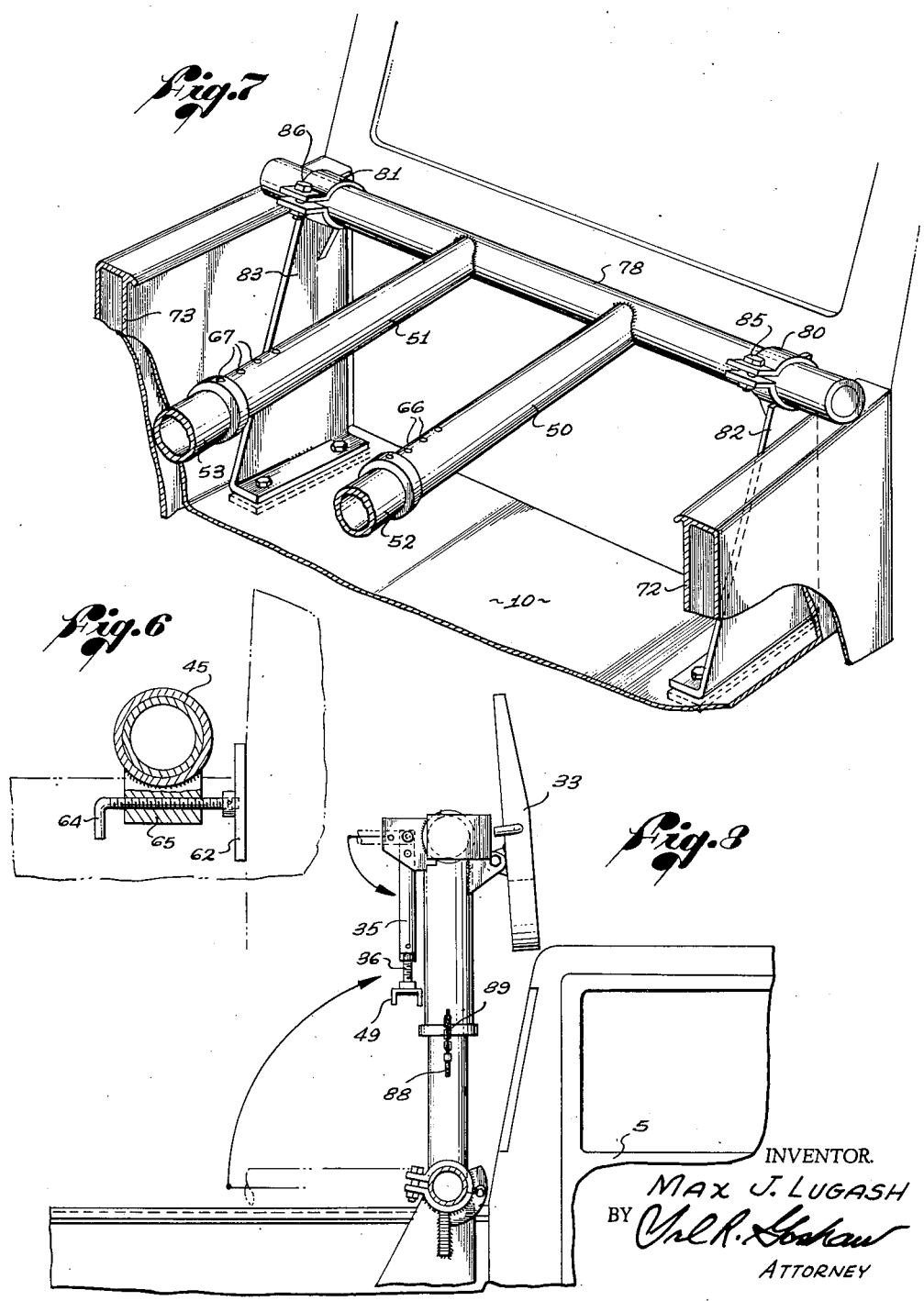

United States Patent Office 3,164,399
Patented Jan. 5, 1965

3,164,399
HINGED SEMI-TRAILER COUPLING UNIT
Max J. Lugash, Los Angeles, Calif., assignor to Maxon Industries, Inc., Vernon, Calif., a corporation of California
Filed Nov. 19, 1962, Ser. No. 238,522
11 Claims. (Cl. 280—423)

This invention relates to an adjunct or unit of a pulling or power vehicle to permit the coupling thereof to a trailer, particularly a semi-trailer.

The use of semi-trailers whereby the front end thereof may be coupled by a "fifth wheel" type of connection to a power truck is well known. The present invention is directed to an adjustable frame which is attached to a truck of the pickup type to permit the pickup truck to serve as the power vehicle for semi-trailers in the same manner as the standard power cab. In my application, Serial No. 217,854, filed August 20, 1962, I disclose and claim a type of framework which may be quickly attached to and detached from the flat beds and/or side panels of pickup trucks. The present invention provides the same result but permits the framework to be quickly rotated from its connecting position on the truck so that the truck can be used for its usual transportation function. To accomplish this result, the framework attachment is either hinged to a panel of a pickup truck frame or to special supports attached to the bed of the truck. The hinged arrangement permits the trailer-attaching unit to be removed from the area enclosed by the truck frame.

The principal object of the invention, therefore, is to facilitate the adaptation of a pickup truck to motive power for semi-trailers.

Another object of the invention is to provide an improved coupling structure for connecting semi-trailers to pickup trucks of different sizes.

A further object of the invention is to provide a coupling unit for a semi-trailer on a pickup truck which is easily removed from the truck frame.

A better understanding of this invention may be had from the following description when read in conjunction with the accompanying drawings, in which:

FIG. 1 is a perspective view of one embodiment of the invention;

FIG. 2 is a view of the invention shown in FIG. 1 in its rotated non-connecting position;

FIG. 3 is a detail view showing the connection to one type of side panel of a truck;

FIG. 4 is a detail view showing the connection to another type of the side panel of a truck;

FIG. 5 is a side view of the connector plate attachment;

FIG. 6 is a detail view taken along the line 6—6 of FIG. 1;

FIG. 7 is a perspective view of another modification of the attachment to a truck; and FIG. 8 is a view showing the modification of FIG. 7 rotatably removed from the truck frame area.

Referring, now, to the drawings, particularly FIGS. 1 and 2, in which the same numerals identify similar elements, a portion of a pickup cab is shown at 5 and a body frame is shown generally at 6 with side panels 8 and 9, a bed 10 with wheels, one of which is shown at 12. Attached to the upper rail of panel 8 are fixed hinge elements 14 and 15 having respective hinge rotating elements 16 and 17 to which are attached by any suitable means, such as by welding, tubes 19 and 20, respectively. Similar tubes 22 and 23 are fastened to the upper rail of panel 9 by flanges 24 and 25 welded thereto and having angular extensions such as shown in FIG. 3 at 26.

The two tubes 19 and 22 are telescoped within a tube 28 to which is attached by any suitable means, such as by welding, the ends of two parallel tubes 30 and 31. Mounted on tubes 30 and 31 and pivoted on ears 29 is a "fifth wheel" connector plate 33 for a trailer, the connector plate having a locking bolt 34 therein as shown in FIG. 5. A pair of standards 35 and 36 hinged to plate 37 and 42, respectively, have adjusting screws 36' and 46 interposed between the plates 37 and 42 and a bed plate 49 to provide additional support for the connector plate 33.

To provide for varying widths of truck frames, the tubes 19 and 22 have holes 38 and 39 therein in which pins 40 and 41, passing through tube 28, are insertable. Tubes 20 and 23 also have holes 43 and 44 therein, these tubes telescoping in an interconnecting tube 45 in which are pins 47 and 48 passing therethrough for insertion in holes 43 and 44, respectively. Thus, tubes 20, 23, and 45 are adjustable to the width of the truck frame.

To the tube 45 are attached, such as by welding, the ends of tube members 50 and 51 into which telescope tube members 52 and 53, respectively, the other ends of members 52 and 53 being telescoped into tubes 30 and 31. Although three telescoping tube members are shown, two may also be used depending on the length of the truck bed. The tube member 52 is locked to tube 30 by a pin 55 held by a chain 56, while tube member 53 is locked to tube 31 by a pin 58 held by a chain 59.

The above described frame permits the pickup to be used as the power source for a semi-trailer. If it is desired to use the pickup in its normal manner, the frame is unlatched from panel 9 and rotated on hinges 14–15–16–17 to the position shown in FIG. 2 where it may be locked to panel 8 by a chain 61. Another feature, better shown in FIG. 2, is a bumper brace 62 which may be positioned against the back of cab 5 by screws 63 and 64 passing through lugs on tube 45, as shown at 65 in FIG. 6. This gives more support during the coupling action of a trailer to the truck. Also, as shown in FIG. 2, are holes 66 and 67 for adjusting tubes 30, 31 in tubes 52 and 53. Holes 69 and 70 in tubes 50 and 51 may also be used for locking pins for these tubes.

Referring, now, to FIGS. 7 and 8, panels 72 and 73 have internally turned over flanges as shown in FIG. 4. To make attachment to such panels, a lug 74 held by a bolt 76 is used. Such a fastening may be used for tubes 22 and 23 in FIG. 1 or for both ends of tubes 19 and 22 when used with the modification shown in FIGS. 7 and 8. To provide the rotational feature which removes the frame from the truck body, the front transverse element is a tube 78 to which are welded tubes 50 and 51, the tube 78 being rotatably mounted in clamps 80 and 81 on stanchions 82 and 83, respectively, which may be bolted or welded to the bed 10 of the truck. The clamps are tightened by bolts 85 and 86 when the frame is used to connect a trailer thereto and when the frame is rotated to a vertical position as shown in FIG. 8. Pin and chain combinations, such as shown at 88 and 89, provide adjustability for the longitudinal members of the frame.

Thus, the above-described invention permits the "fifth wheel" connector plate and frame to remain attached to the truck while the truck is used for normal cargo transportation. The frames are particularly simple and are rapidly changeable between their two positions.

I claim:
1. A coupling unit for connecting a trailer to a truck comprising a pair of parallel longitudinally adjustable members transversely positioned with respect to the bed of said truck and fixedly hinged to one side of the frame of said truck at one end of each of said members and having the other ends of each of said members detachably locked to the other side of the frame of said truck, a pair of parallel longitudinally adjustable members interconnecting said first-mentioned members, all of said members being horizontal when in a trailer-connecting position and a trailer-connecting element mounted on said second-mentioned pair of parallel longitudinally adjustable members, said unit being rotatable to a vertical position when said first mentioned members are detached from said other side of said frame.

2. A coupling unit in accordance with claim 1 in which an adjustable bumper member is attached to one of said first-mentioned members and positioned between said member and the end of the frame of said truck and in contact with said frame.

3. A coupling unit in accordance with claim 1 in which each one of said adjustable parallel members include telescoping tubes, a support being provided between said bed of said truck and one of said first-mentioned members.

4. A coupling unit in accordance with claim 1 in which all of said members and said trailer-connecting element being rotatable through an angle of substantially 90 degrees, locking means being provided therefor when in a vertical position.

5. A semi-trailer coupling unit between a trailer and a truck comprising a pair of parallel longitudinally adjustable members transversely positioned with respect to the bed of said truck and having the ends thereof attached to said truck, a second pair of parallel longitudinally adjustable members extending longitudinally of said truck bed and interconnecting said first-mentioned pair of members, a trailer-connecting element mounted on said second-mentioned pair of members, supporting means between said bed of said truck and one of said first-mentioned pair of members, means for rotating said unit through an angle of substantially 90 degrees from a horizontal trailer-connecting position to a vertical bed-clearing position, and means for locking said unit in said vertical position.

6. A semi-trailer coupling unit in accordance with claim 5 in which a pair of supports is provided and attached between said bed of said truck and the ends of one of said first-mentioned transversely positioned members, said one first-mentioned member being rotatable on said support.

7. A semi-trailer coupling unit in accordance with claim 6 in which a pair of supports is provided between the vertical position of the other of said transversely positioned members and said bed of said truck to aid in supporting said trailer-connecting element.

8. A semi-trailer coupling unit in accordance with claim 5 in which each of said second pair of adjustable members are telescoping tubes, said first-mentioned means comprising hinges between one pair of ends of said first-mentioned pair of members and one side of the frame of said truck.

9. A semi-trailer coupling unit comprising a pickup truck, a frame including two pairs of members, one pair extending transversely of said truck and the other pair of members interconnecting said first pair of members and extending longitudinally of said truck, all of said members lying in substantially the same plane, a trailer-connecting element mounted on one of said pair of frame members, means for rotating said frame to a plane at substantially 90 degrees to said first-mentioned plane, said first-mentioned plane being substantially horizontal when in trailer-connecting position and said second-mentioned plane being in truck-bed clearing position.

10. A semi-trailer coupling unit in accordance with claim 9 in which said last mentioned means includes one end of each of one pair of members hinged to the side of said truck for rotating said frame, means being provided for locking said frame in said second-mentioned plane.

11. A semi-trailer coupling unit in accordance with claim 9 in which mounting supports are provided for the ends of one of said first-mentioned members, said frame being rotatable on said supports.

References Cited by the Examiner

UNITED STATES PATENTS

| | | | |
|---|---|---|---|
| 2,152,279 | 3/39 | Randall et al. | 280—402 X |
| 2,366,892 | 1/45 | Donnellan | 280—423 X |
| 2,425,521 | 8/47 | Ellberg | 280—438 |
| 2,925,286 | 2/60 | Hodges | 280—423 X |

OTHER REFERENCES

Goldhofer, German Application 1,038,410, printed Sept. 4, 1958 (Kl. 2,63C).

A. HARRY LEVY, *Primary Examiner.*

LEO FRIAGLIA, *Examiner.*